US007975086B1

(12) United States Patent
Spitzer

(10) Patent No.: US 7,975,086 B1
(45) Date of Patent: Jul. 5, 2011

(54) APPARATUS FOR REAL-TIME ARBITRATION BETWEEN MASTERS AND REQUESTORS AND METHOD FOR OPERATING THE SAME

(75) Inventor: Marc Spitzer, San Jose, CA (US)

(73) Assignee: PMC-Sierra US, Inc., Santa Clara, CA (US)

( * ) Notice: Subject to any disclaimer, the term of this patent is extended or adjusted under 35 U.S.C. 154(b) by 1384 days.

(21) Appl. No.: 11/152,965

(22) Filed: Jun. 14, 2005

Related U.S. Application Data

(63) Continuation-in-part of application No. 11/075,543, filed on Mar. 8, 2005, now abandoned.

(60) Provisional application No. 60/551,643, filed on Mar. 8, 2004.

(51) Int. Cl.
*G06F 13/00* (2006.01)
*G06F 12/00* (2006.01)
*G06F 13/14* (2006.01)

(52) U.S. Cl. ............ 710/107; 710/28; 710/36; 710/240; 710/243

(58) Field of Classification Search ........... 710/240–244
See application file for complete search history.

(56) References Cited

U.S. PATENT DOCUMENTS

| 6,301,642 B1 * | 10/2001 | Jones et al. | 711/151 |
| 6,859,852 B2 * | 2/2005 | Jahnke et al. | 710/243 |
| 7,120,714 B2 * | 10/2006 | O'Connor et al. | 710/243 |

OTHER PUBLICATIONS

Computers Without Clocks—taken from Scientific American—Aug. 2002—11 pages.*
Clockless Chips—taken from Technology Review—Oct. 2001—7 pages.*

* cited by examiner

*Primary Examiner* — Brian T Misiura
(74) *Attorney, Agent, or Firm* — Martine Penilla & Gencarella, LLP

(57) ABSTRACT

A circuit is provided for handling multiple requestors desiring access to a resource. The circuit includes a plurality of arbitrators and a plurality of masters. Each master is assigned to a different one of the plurality of arbitrators. Each arbitrator is defined to select a different one of the multiple requestors to be serviced by the master to which the arbitrator is assigned. Also, the plurality of arbitrators is defined to make their requestor selections in the same clock cycle. Additionally, the plurality of arbitrators is defined to make their requestor selections such that selection of a particular requestor is not duplicated among the plurality of arbitrators.

20 Claims, 7 Drawing Sheets

APPARATUS FOR REAL-TIME ARBITRATION BETWEEN MASTERS AND REQUESTORS AND METHOD FOR OPERATING THE SAME

CROSS-REFERENCE TO RELATED APPLICATIONS

This application is a continuation-in-part of prior U.S. application Ser. No. 11/075,543, filed Mar. 8, 2005 now abandoned, which claims the benefit of U.S. Provisional Application No. 60/551,643, filed on Mar. 8, 2004. The disclosures of U.S. application Ser. No. 11/075,543 and U.S. Provisional Application No. 60/551,643 are incorporated herein by reference. This application is also related to U.S. patent application Ser. No. 11/152,993, filed on even date herewith, and entitled "Apparatus for Masked Arbitration Between Masters and Requestors and Method for Operating the Same," the disclosure of which is incorporated herein by reference.

BACKGROUND

In communication systems, resources are made available to other systems. Such resources can vary, but typically include access to processing power, execution of code, access of data, or exchange of data. Given that a resource may be requested by one or more requesting entities (e.g., requestors) at any given time or time period, bottlenecks can occur. To handle such bottlenecks, arbitration schemes have been used.

Normal arbitration schemes use a state machine which is designed to only look at one master at a time, per clock cycle. Then, during a given cycle, the state machine will assign one of many requestors to one master. This means that multiple requestors may have to wait for later cycles, despite the fact that there are enough masters available to provide the requested service.

In view of the foregoing, there is a need for a system, circuitry, and method for enabling more efficient access to resources when multiple requestors need such resource access.

SUMMARY

In one embodiment, a circuit is disclosed for handling multiple requestors desiring access to a resource. The circuit includes a plurality of arbitrators and a plurality of masters. Each master is assigned to a different one of the plurality of arbitrators. Each arbitrator is defined to select a different one of the multiple requestors to be serviced by the master to which the arbitrator is assigned. Also, the plurality of arbitrators is defined to make their requestor selections in the same clock cycle. Additionally, the plurality of arbitrators is defined to make their requestor selections such that selection of a particular requestor is not duplicated among the plurality of arbitrators.

In another embodiment, an interface circuit is disclosed. The interface circuit of this embodiment is defined to connect a plurality of requestors to a plurality of masters, wherein a number of the plurality of requestors exceeds a number of the plurality of masters. The interface circuit includes a plurality of arbitrators representing an arbitrator hierarchy. Each arbitrator in the plurality of arbitrators is uniquely assigned to one of the plurality of masters. Also, each arbitrator in the plurality of arbitrators is defined to select in a same clock cycle a different one of the plurality of requestors to be serviced by the master to which the arbitrator is uniquely assigned.

In another embodiment, a method is disclosed for operating arbitrators in a hierarchy of arbitrators to uniquely connect multiple requestors to multiple masters in a same clock cycle. Each arbitrator in the hierarchy of arbitrators is assigned to support a different one of the multiple masters. In the method, each arbitrator is operated to select in the same clock cycle a different one of the multiple requestors to be serviced by the master that is supported by the arbitrator.

Other aspects of the invention will become more apparent from the following detailed description, taken in conjunction with the accompanying drawings, illustrating by way of example the present invention.

DETAILED DESCRIPTION

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
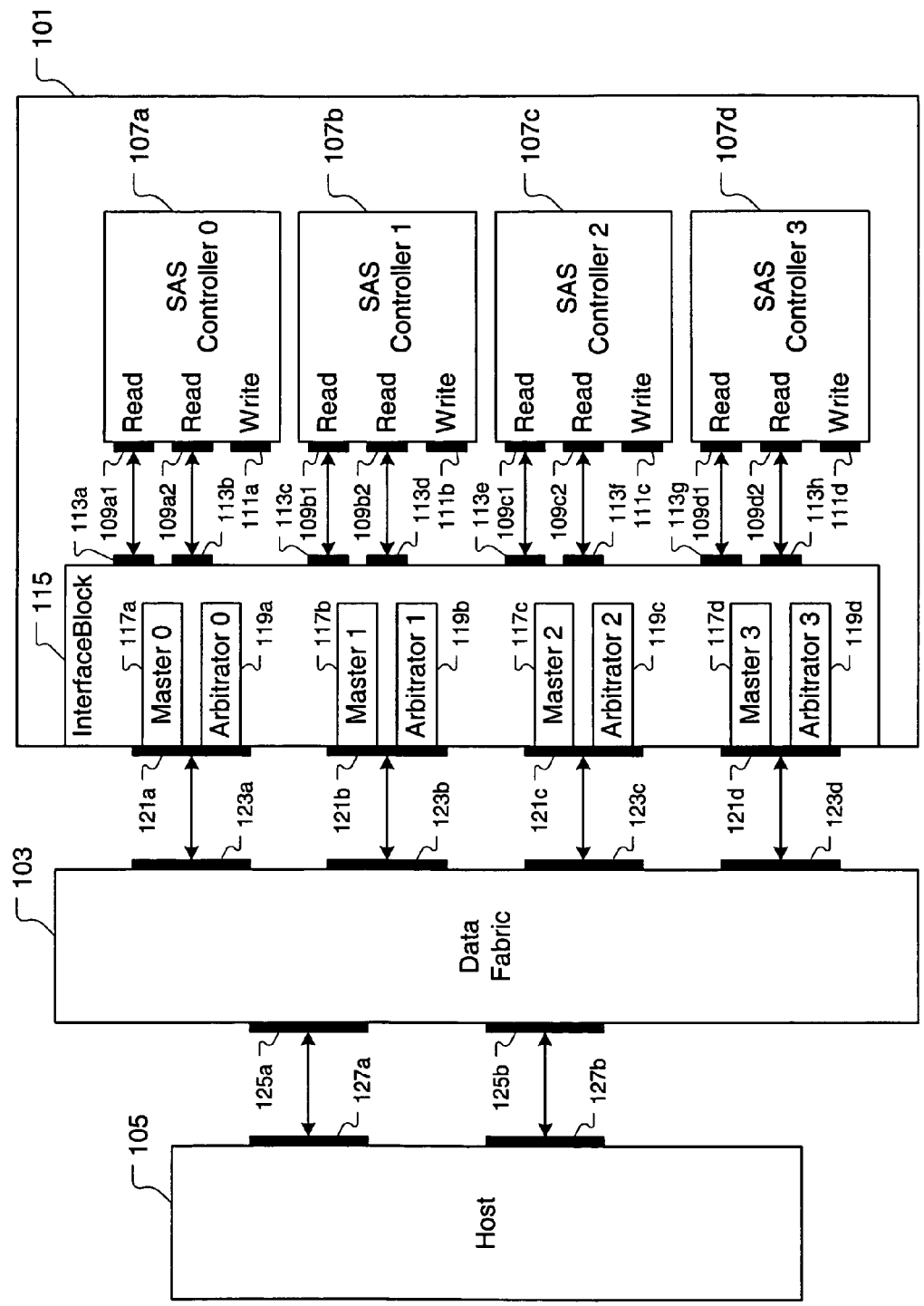
FIG. 1 is an illustration showing an exemplary portion of a Serial Attached SCSI (SAS) communication architecture.

FIG. 1 is an illustration showing an exemplary portion of a Serial Attached SCSI (SAS) communication architecture. The architecture includes a SAS interface engine 101, a data fabric 103, and a host block 105. The SAS interface engine 101 includes a number of SAS controllers 107a-107d. In one embodiment, each of the SAS controllers 107a-107d is connected to control a peripheral device, e.g., disk drive. In the embodiment of FIG. 1, four SAS controllers 107a-107d are shown. However, it should be appreciated that in other embodiments the SAS interface engine 101 can include any number of SAS controllers. In the embodiment of FIG. 1, each SAS controller 107a-107d includes two read DMA (direct memory access) engines and one write DMA engine. However, it should be appreciated that in other embodiments the SAS controllers 107a-107d can be configured to have a different number of read and write DMA engines.

For SAS controller 0 (107a), the read DMA engines are respectively connected to read ports 109a1 and 109a2, and the write DMA engine is connected to a write port 111a. For SAS controller 1 (107b), the read DMA engines are respectively connected to read ports 109b1 and 109b2, and the write DMA engine is connected to a write port 111b. For SAS controller 2 (107c), the read DMA engines are respectively connected to read ports 109c1 and 109c2, and the write DMA engine is connected to a write port 111c. For SAS controller 3 (107d), the read DMA engines are respectively connected to read ports 109d1 and 109d2, and the write DMA engine is connected to a write port 111d.

Each read port 109a1-109d2 of the SAS controllers 107a-107d is connected to a respective port 113a-113h of an interface block 115 within the SAS interface engine 101. The interface block 115 presents a generic DMA interface to the SAS controllers 107a-107d. In the embodiment of FIG. 1, the generic DMA interface presented by the interface block 115 includes four master ports 121a-121d. However, it should be appreciated that in other embodiments the interface block 115 can be configured to have a different number of master ports. Each master port 121a-121d is serviced by a respective master read engine 117a-117d and a respective master support engine 119a-119d. For ease of discussion, each master read engine 117a-117d is referred to as a "master" and each master support engine 119a-119d is referred to as an "arbitrator." Each master port 121a-121d is connected to a respective port 123a-123d of the data fabric 103. Thus, the masters 117a-117d effectively define the interface from the data fabric 103 to the read DMA engines of the SAS controllers 107a-107d.

The data fabric 103 operates as a routing engine to route communications from targets 127a-127b on the host block 105 to the SAS interface engine 101. In one embodiment, the data fabric is defined as a state machine that operates to connect the master ports 121a-121d to targets 127a-127b, appropriately. In the embodiment of FIG. 1, the host block 105 is depicted as having two targets 127a-127b, i.e., dataport interfaces 127a-127b, that connect with a respective port 125a-125b of the data fabric 103. It should be appreciated, however, that in other embodiments the host block 105 can include a different number of targets.

During operation of the SAS communication architecture, each read DMA engine of the SAS controllers 107a-107d can act as a read requestor. When a read DMA engine issues a read request from its respective read port 109a1-109d2, the read request is transmitted to the interface block 115, and to an available master 121a-121d. From the master 121a-121d, the read request is transmitted through the data fabric 103 to the appropriate target 127a-127b at the host block 105. The read request is then processed at the host block 105. In one embodiment, the host block 105 is defined to communicate with an operating system of a computing platform.

With the SAS interface engine 101 including fewer masters 117a-117d than read DMA engines, it should be appreciated that a system is needed to efficiently arbitrate between the multiple read DMA engines and the multiple masters 117a-117d. For discussion purposes, each read DMA engine and its associated read port 109a1-109d2 within the multiple SAS controllers 107a-107d will be referred to hereafter as a "requestor."

In one embodiment of the present invention, the requests transmitted from each requestor are simultaneously transmitted to each arbitrator 119a-119d associated with a respective master 117a-117d. Each arbitrator 119a-119d processes each transmission from the various requestors to determine which requestor is to be serviced by the master corresponding to the arbitrator. To avoid conflicts, a particular transmission from a given requestor should not be simultaneously serviced by multiple masters. With the present invention, each transmission is processed by each arbitrator in real-time. Thus, the number of requestors that can be serviced in a given clock cycle is equal to the number of available masters. Once the arbitrator has selected a requestor for its master to service, the master is notified of the selection and proceeds with processing the transmission from the selected requestor. The master is not involved in the requestor selection process. Thus, the master is simply made aware of the particular requestor that it needs to service.

Figure 2:
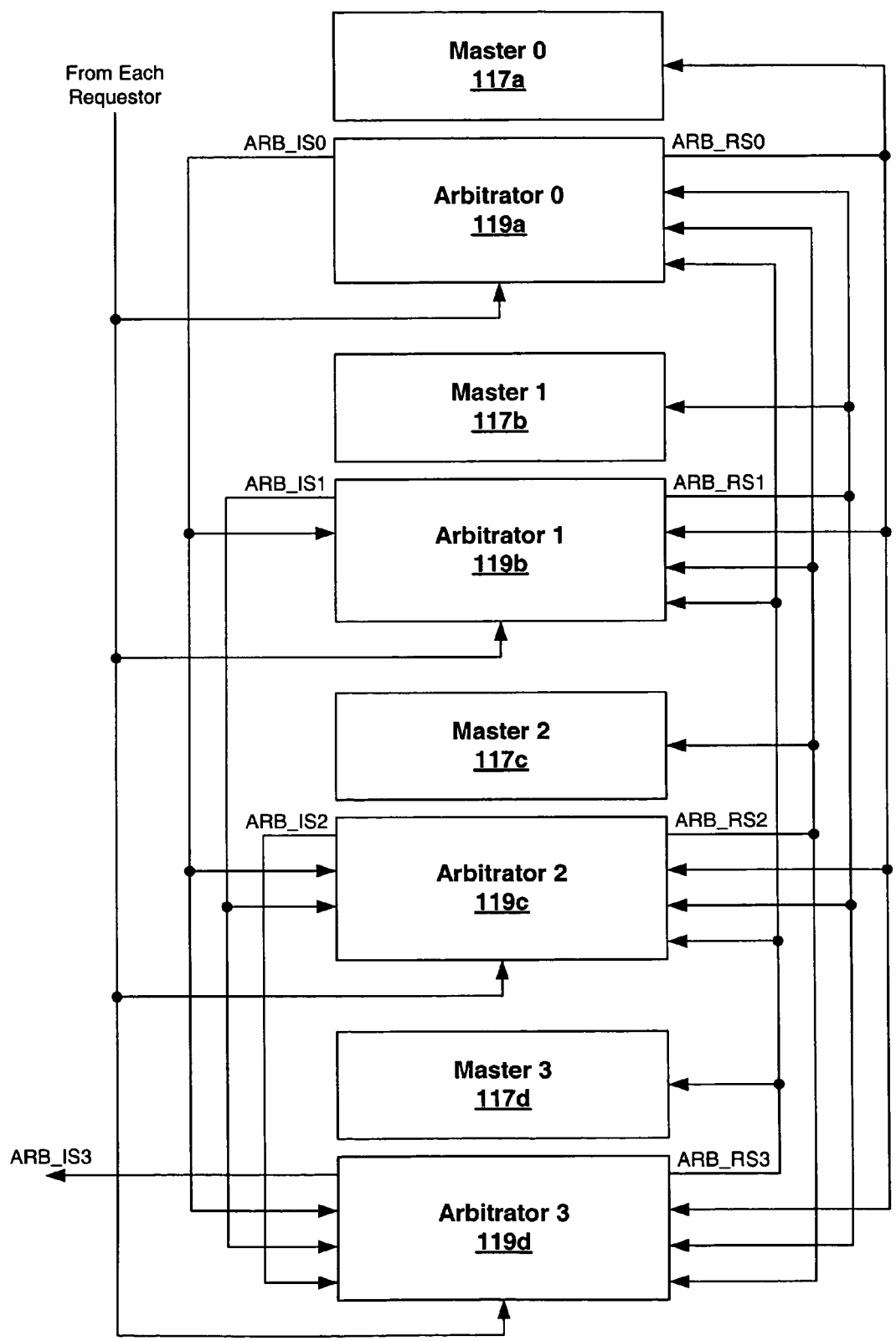
FIG. 2 is an illustration showing interconnections between the arbitrators and the masters within the interface block of FIG. 1, in accordance with one embodiment of the present invention.

FIG. 2 is an illustration showing interconnections between the arbitrators 119a-119d and the masters 117a-117d within the interface block 115 of FIG. 1, in accordance with one embodiment of the present invention. As previously mentioned, the SAS interface engine 101 of FIG. 1 represents one exemplary implementation having eight read DMA engines and four masters 117a-117d. It should be appreciated that the present invention can be implemented with any number of read DMA engines and any number of masters. However, for discussion purposes, the present invention is described in the context of eight read DMA engines and four masters, as depicted in FIG. 1. Given the description of the present invention herein, adjustment of the present invention to accommodate a different number of read DMA engines and/or masters will be readily apparent to those skilled in the art.

Using real-time arbitration, the arbitrators 119a-119d are defined to select a requestor to be serviced by their respective master 117a-117d, such that a requestor can be selected for each master 117a-117d in a single clock cycle. The real-time arbitration provided by the arbitrators 119a-119d allows as many requestors to be serviced at one time as there are available masters 117a-117d. With respect to FIG. 2, each arbitrator 119a-119d is connected to receive a transmission "from each requestor", i.e., from each read DMA engine of the SAS controllers 107a-107d, in accordance with each clock cycle. The transmission received from each requestor signifies whether or not a request is being made by the requestor. If a particular arbitrator's master is not busy servicing a requestor, the incoming transmissions from the requestors are processed by the particular arbitrator to select one of the requestors to be serviced by the particular arbitrator's master.

The identity of the requestor selected by the particular arbitrator for servicing is communicated as an immediate selection (ARB_IS0, ARB_IS1, ARB_IS2, ARB_IS3) to each lower arbitrator as defined by an arbitrator hierarchy. In the arbitrator hierarchy, arbitrator 0 (119a) is the highest level arbitrator and arbitrator 3 (119d) is the lowest level arbitrator. Thus, the immediate selection ARB_IS0 is communicated to arbitrator 1 (119b), arbitrator 2 (119c), and arbitrator 3 (119d). The immediate selection ARB_IS1 is communicated to arbitrator 2 (119c) and arbitrator 3 (119d). The immediate selection ARB_IS2 is communicated to arbitrator 3 (119d). Because arbitrator 3 (119d) is the lowest level arbitrator, the immediate selection ARB_IS3 is not communicated to any other arbitrator.

The immediate selections (ARB_IS0, ARB_IS1, ARB_IS2, ARB_IS3) communicated from a particular arbitrator to each lower arbitrator will cause each lower arbitrator to avoid duplicating selection of a requestor that is currently being selected by a higher level arbitrator. Thus, the multiple arbitrators 119a-119d are able to select separate requestors for servicing without selection overlap. Once each arbitrator 119a-119d has selected a requestor to be serviced by their respective master 117a-117d, the identities of the selected requestors are registered on the next clock cycle. The registered identity of the selected requestor is then communicated to the arbitrator's master and to each other arbitrator. Communication of the selected requestor to the appropriate master enables the master to begin servicing the requestor. Communication of the selected requestor to each other arbitrator continues for the duration of the selected requestor's servicing to ensure that each other arbitrator does not select a requestor that is currently being serviced.

Thus, the requestor selected by arbitrator 0 (119*a*) is communicated as ARB_RS0 to master 0 (117*a*) and to each of arbitrator 1 (119*b*), arbitrator 2 (119*c*), and arbitrator 3 (119*d*). The requestor selected by arbitrator 1 (119*b*) is communicated as ARB_RS1 to master 1 (117*b*) and to each of arbitrator 0 (119*a*), arbitrator 2 (119*c*), and arbitrator 3 (119*d*). The requestor selected by arbitrator 2 (119*c*) is communicated as ARB_RS2 to master 2 (117*c*) and to each of arbitrator 0 (119*a*), arbitrator 1 (119*b*), and arbitrator 3 (119*d*). The requestor selected by arbitrator 3 (119*d*) is communicated as ARB_RS3 to master 3 (117*d*) and to each of arbitrator 0 (119*a*), arbitrator 1 (119*b*), and arbitrator 2 (119*c*).

It should be appreciated that each arbitrator 119*a*-119*d* is defined to select a requestor in the same clock cycle without overlap in requestor selection. The functionality of each arbitrator 119*a*-119*d* is described in more detail below to enable a greater appreciation of how the arbitrators 119*a*-119*d* of the present invention accomplish the simultaneous and unique requestor selection during a single clock cycle, i.e., in real-time.

Figure 3:
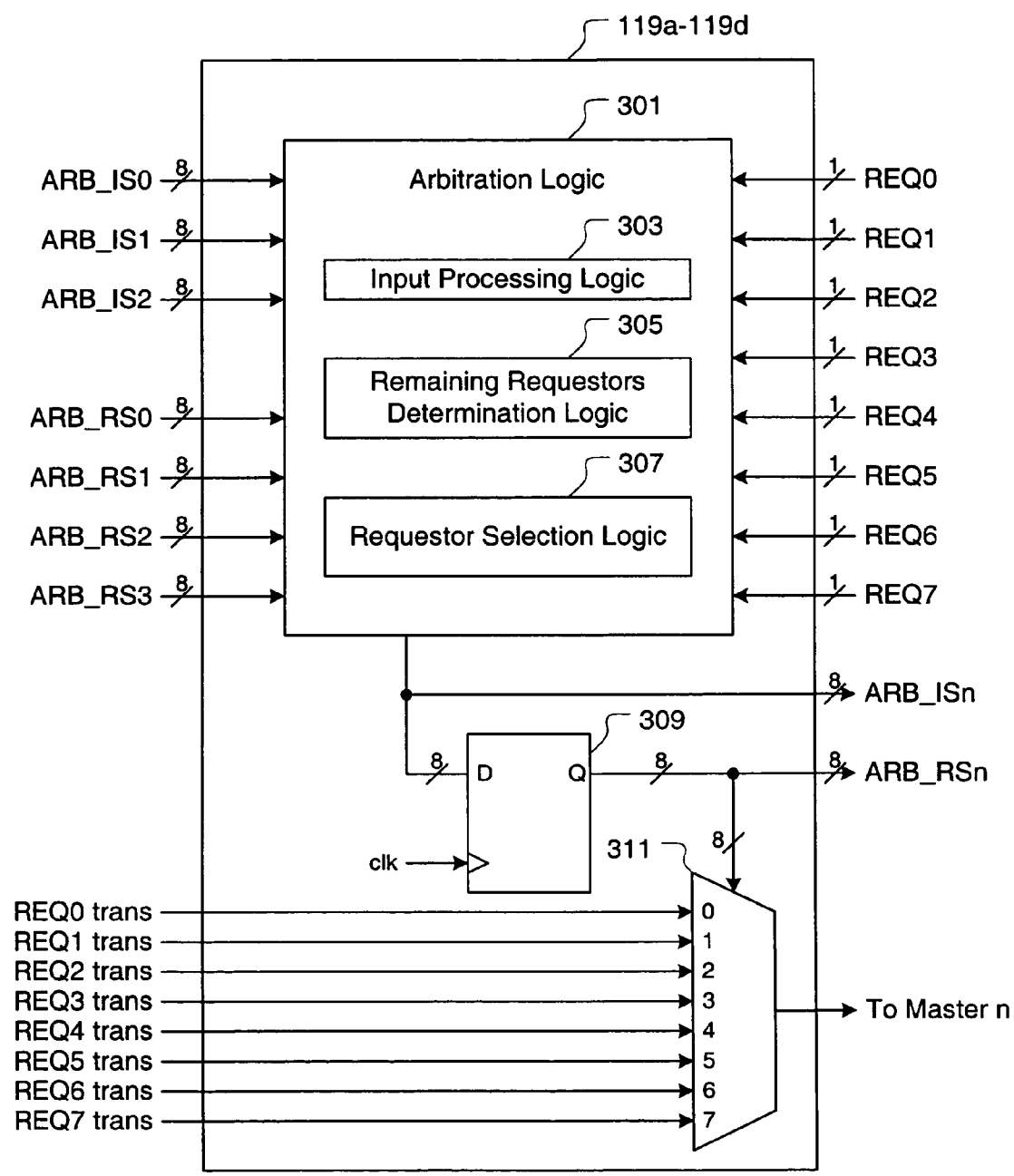
FIG. 3 is an illustration showing an internal configuration of each arbitrator, in accordance with one embodiment of the present invention.

FIG. 3 is an illustration showing an internal configuration of each arbitrator 119*a*-119*d*, in accordance with one embodiment of the present invention. It should be understood that the arbitrator configuration depicted in FIG. 3 is generalized to an arbitrator "n" that provides requestor selection for a master "n." As previously discussed with respect to FIG. 2, each arbitrator is defined to receive a transmission from each requestor, i.e., from each read DMA engine of the SAS controllers 107*a*-107*d*. The transmission received from each requestor includes two components. A first component identifies whether or not a request is currently being made by the requestor. A second component represents the data corresponding to the request being made by the requestor.

With respect to FIG. 3, the first component of the transmission received from each requestor is respectively represented as input REQ0 through REQ7. In one embodiment, each input REQ0 through REQ7 is a one bit signal indicating requestor activity. Thus, each input REQ0 through REQ7 indicates whether or not a request is currently being made by the corresponding requestor. In this embodiment, a high signal, i.e., "1", indicates that a request is currently being made, and a low signal, i.e., "0", indicates that a request is not being made. The second component of the transmission received from each requestor is respectively represented as input "REQ0 trans" through "REQ7 trans." Each input "REQ0 trans" through "REQ7 trans" is communicated as an input to a multiplexer 311 within the arbitrator 119*a*-119*d*. The multiplexer 311 is described in more detail below.

The arbitrator 119*a*-119*d* is also defined to receive as input each of the immediate requestor selections (ARB_IS0, ARB_IS1, ARB_IS2) as communicated from the higher level arbitrators. However, it should be appreciated that because arbitrator 0 (119*a*) is the highest level arbitrator in the arbitrator hierarchy, arbitrator 0 (119*a*) will not receive immediate requestor selection input from any other arbitrators. Thus, the inputs ARB_IS0, ARB_IS1, and ARB_IS2 are not be connected in arbitrator 0 (119*a*). Similarly, arbitrator 1 (119*b*) is connected to receive the ARB_IS0 input, but not the ARB_IS1 and ARB_IS2 inputs. Arbitrator 2 (119*c*) is connected to receive the ARB_IS0 and ARB_IS1 inputs, but not the ARB_IS2 input. Because arbitrator 3 (119*d*) represents the lowest level in the arbitrator hierarchy, arbitrator 3 (119*d*) is connected to receive each of the ARB_IS0, ARB_IS1, and ARB_IS2 inputs.

Additionally, each of the immediate requestor selection inputs is defined by a number of bits equal to the number of requestors, i.e., the number of read DMA engines. Thus, in the present embodiment, each of the inputs ARB_IS0, ARB_IS1, and ARB_IS2 is defined by eight bits, wherein each bit corresponds to a respective requestor. A high signal for a given bit in the immediate requestor selection input indicates that the requestor corresponding to the given bit has been selected for servicing by the arbitrator providing the immediate requestor selection input. Thus, if bit 0 is high in ARB_IS0, the arbitrator 0 (119*a*) has selected requestor 0 for servicing. In another example, if bit 5 is high in ARB_IS1, the arbitrator 1 (119*b*) has selected requestor 5 for servicing, and so on The arbitrator 119*a*-119*d* is further defined to receive as input the identities of each selected requestor that is currently registered by each arbitrator. For ease of discussion, the selected requestors that are currently registered by each arbitrator will be referred to as registered selections, hereafter. As previously discussed the registered selections are communicated as ARB_RS0, ARB_RS1, ARB_RS2, and ARB_RS3. Each of the registered selection inputs is defined by a number of bits equal to the number of requestors, i.e., the number of read DMA engines. Thus, in the present embodiment, each of the inputs ARB_RS0, ARB_RS1, ARB_RS2, and ARB_RS3 is defined by eight bits, wherein each bit corresponds to a respective requestor. A high signal for a given bit in the registered selection input indicates that the requestor corresponding to the given bit has been selected in a previous clock cycle, and remains selected, for servicing by the arbitrator providing the registered selection input. Thus, if bit 3 is high in ARB_RS2, the arbitrator 2 (119*c*) continues to have requestor 3 registered as being selected for servicing. Thus, master 2 is servicing requestor 3. In another example, if bit 7 is high in ARB_IS3, the arbitrator 3 (119*d*) continues to have requestor 7 registered as being selected for servicing, and so on.

Within the arbitrator 119*a*-119*d*, each of the inputs REQ0 through REQ7, ARB_IS0 through ARB_IS2, and ARB_RS0 through ARB_RS3, as described above, is received by arbitration logic 301. The arbitration logic 301 is defined to select one of the requestors to be serviced by the master associated with the arbitrator. Because the arbitration logic 301 is defined by combinatorial logic, there are no registers within the arbitration logic 301. Therefore, so long as the master associated with the arbitrator is not busy servicing a requestor, the arbitration logic 301 will function to select a requestor to be serviced by the master upon each clock cycle. Thus, the number of requestors that can be simultaneously serviced is equal to the number of masters.

The arbitration logic 301 includes input processing logic 303, remaining requestors determination logic 305, and requestor selection logic 307. The detailed functionality of the arbitration logic 301 is described below with respect to each of the input processing logic 303, remaining requestors determination logic 305, and requestor selection logic 307. However, for the immediate discussion, it should be understood that at each clock cycle the arbitration logic 301 outputs an identifier of the requestor selected to be serviced by the associated master, assuming that the master is not already busy servicing a requestor at the clock cycle. The output of the arbitration logic 301 is defined by a number of bits equal to the number of requestors, i.e., the number of read DMA engines. Thus, in the present embodiment, output of the arbitration logic 301 is defined by eight bits, wherein each bit corresponds to a respective requestor. A high signal for a given bit in the output of the arbitration logic 301 indicates that the requestor corresponding to the given bit has been selected in the present clock cycle for servicing by the master. For example, if bit 3 is high in the output of the arbitration logic 301, requestor 3 is selected in the present clock cycle for servicing by the master. It should be understood that the arbitration logic 301 is defined such that only one requestor can be selected for servicing by the master at a given time.

The output of the arbitration logic 301 is provided as the immediate selection output from the arbitrator. Thus, for the arbitrator "n", the output of the arbitration logic 301 is provided as the immediate selection output ARB_ISn. The output of the arbitration logic 301 is also transmitted to a flip-flop 309. Then, at the next clock cycle, the output of the arbitration logic 301 from the previous clock cycle is output from the flip-flop 309 as the registered selection output for the arbitrator. Thus, the output of the flip-flop 309 is provided as the registered selection output ARB_RSn for the arbitrator "n." It should be appreciated that upon selecting a requestor to be serviced by the associated master, the arbitration logic 301 enters a busy state for the duration required to complete servicing of the selected requestor. In one embodiment, the busy state is identified by setting a "busy bit" within the arbitration logic 301. During the busy state, the arbitration logic 301 does not provide output, and the requestor selection registered in the flip-flop 309 remains unchanged. Accordingly, the registered selection output ARB_RSn for the arbitrator remains unchanged during the busy state. Therefore, communication of the registered selection ARB_RSn to each other arbitrator continues for the duration required to complete servicing of the selected requestor, thus ensuring that selection of the same requestor by multiple arbitrators is avoided. Once the servicing of the requestor is completed, the "busy bit" is reset and the arbitration logic 301 again provides output.

The registered selection as output from the flip-flop 309 is also used as a select signal to the multiplexer 311. The registered selection includes a single high bit corresponding to the one requestor that is currently selected for servicing by the master associated with the arbitrator. The single high bit corresponding to the currently selected requestor will allow the transmission from the currently selected requestor, i.e., one of "REQ0 trans" through "REQ7 trans", to pass through the multiplexer 311 to the master for servicing.

Figure 4:
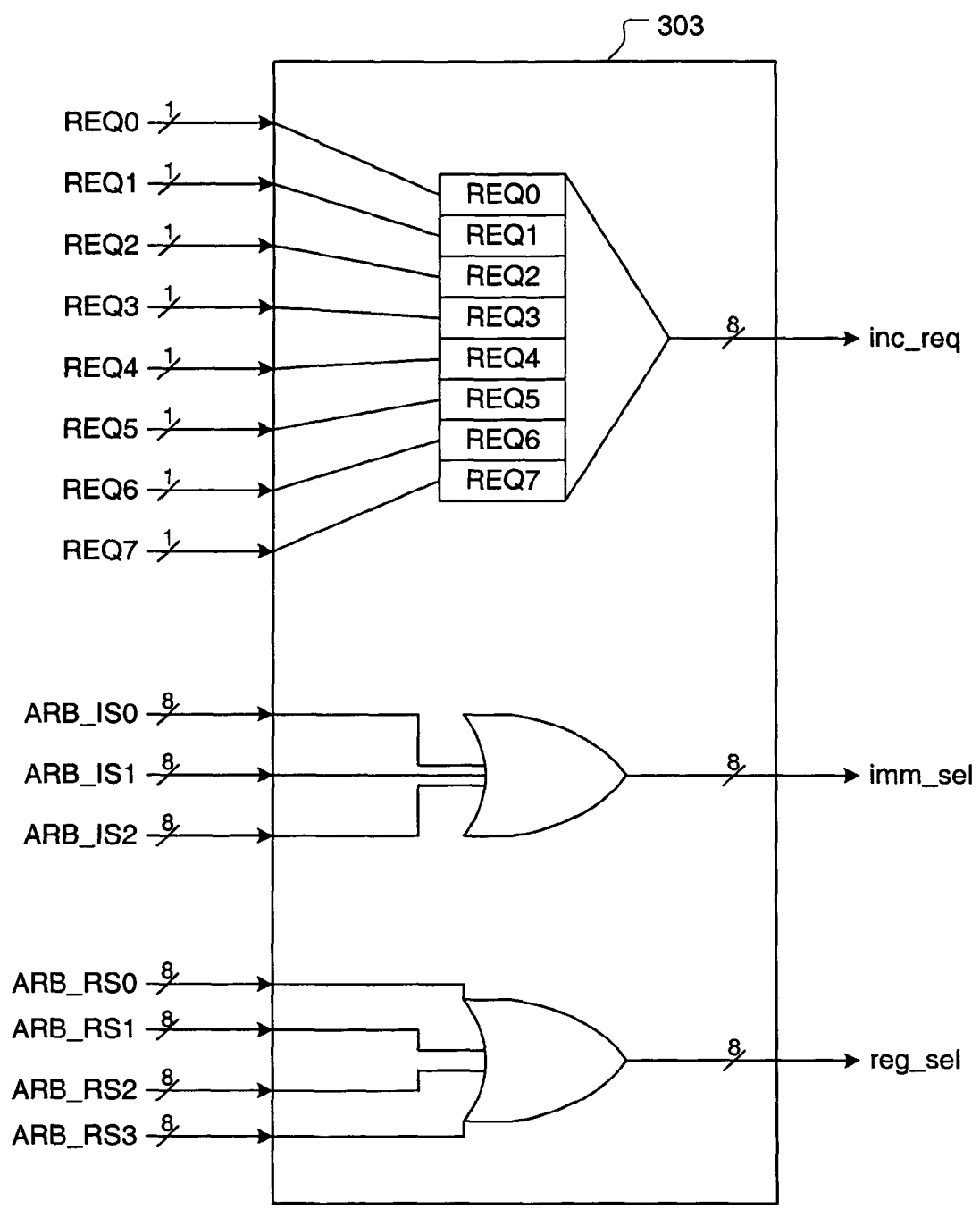
FIG. 4 is an illustration showing the input processing logic, in accordance with one embodiment of the present invention.

FIG. 4 is an illustration showing the input processing logic 303, in accordance with one embodiment of the present invention. As previously discussed, each input REQ0 through REQ7 is a one bit signal indicating whether or not a request is current being made by the associated requestor, wherein a high signal, i.e., "1", indicates that a request is currently being made, and a low signal, i.e., "0", indicates that a request is not being made. The input processing logic 303 receives each of the REQ0 through REQ7 signals and concatenates them into a multi-bit signal called "inc_req", which refers to incoming requests. Since there are eight requestors in the exemplary embodiment, the inc_req signal is defined as an eight bit signal.

The immediate requestor selections (ARB_IS0, ARB_IS1, ARB_IS2) as communicated from the higher level arbitrators are received by the input processing logic 303. As previously discussed, for arbitrator 0 (119a), each of ARB_IS0, ARB_IS1, and ARB_IS2 represent null inputs. For arbitrator 1 (119b), ARB_IS0 is received as an input, but ARB_IS1 and ARB_IS2 represent null inputs. For arbitrator 2 (119c), ARB_IS0 and ARB_IS1 are received as an inputs, but ARB_IS2 represents a null input. For arbitrator 3 (119d), each of ARB_IS0, ARB_IS1, and ARB_IS2 are received as an inputs. The input processing logic 303 performs a bit-wise OR operation on each received immediate requestor selection input (ARB_IS0, ARB_IS1, ARB_IS2) to generate a multi-bit signal called "imm_sel", which refers to immediate selections made. For example, with arbitrator 3 (119d), bit 0 of each input ARB_IS0, ARB_IS1, and ARB_IS2 is OR'd together to generate bit 0 of imm_sel. Similarly, bit 1 of each input ARB_IS0, ARB_IS1, and ARB_IS2 is OR'd together to generate bit 1 of imm_sel, and so on. Since there are eight requestors in the exemplary embodiment, each of the inputs ARB_IS0, ARB_IS1, and ARB_IS2 and the imm_sel signal is defined as an eight bit signal.

It should be appreciated that if a requestor has been selected for servicing by any higher level arbitrator in the present clock cycle, the corresponding requestor bit in the imm_sel signal will be high, otherwise the corresponding requestor bit will be low. Therefore, the high bits in the imm_sel signal represent the requestors that have already been selected by higher level arbitrators during the present clock cycle.

The registered requestor selections for each arbitrator as indicated by ARB_RS0, ARB_RS1, ARB_RS2, and ARB_RS3 are received by the input processing logic 303. The input processing logic 303 performs a bit-wise OR operation on each registered requestor selection input (ARB_RS0, ARB_RS1, ARB_RS2, ARB_RS3) to generate a multi-bit signal called "reg_sel", which refers to registered requestor selections. For example, with arbitrator 1 (119b), bit 0 of each input ARB_RS0, ARB_RS1, ARB_RS2, and ARB_RS3 is OR'd together to generate bit 0 of reg_sel. Similarly, bit 1 of each input ARB_RS0, ARB_RS1, ARB_RS2, and ARB_RS3 is OR'd together to generate bit 1 of reg_sel, and so on. Since there are eight requestors in the exemplary embodiment, each of the inputs ARB_RS0, ARB_RS1, ARB_RS2, and ARB_RS3 and the reg_sel signal is defined as an eight bit signal.

A high signal for a given bit in the registered selection input (ARB_RS0, ARB_RS1, ARB_RS2, ARB_RS3) indicates that the requestor corresponding to the given bit has been selected for servicing in a previous clock cycle by the corresponding arbitrator, and remains registered as being selected for servicing by the corresponding arbitrator. Therefore, it should be appreciated that if a requestor has been selected for servicing in a previous clock cycle by a given arbitrator and remains registered as being selected for servicing by the given arbitrator, the corresponding requestor bit in the reg_sel signal will be high. Otherwise, the corresponding requestor bit will be low. Thus, the high bits in the reg_sel signal represent the requestors that have been selected for servicing in a previous clock cycle and continue to be serviced.

Figure 5:
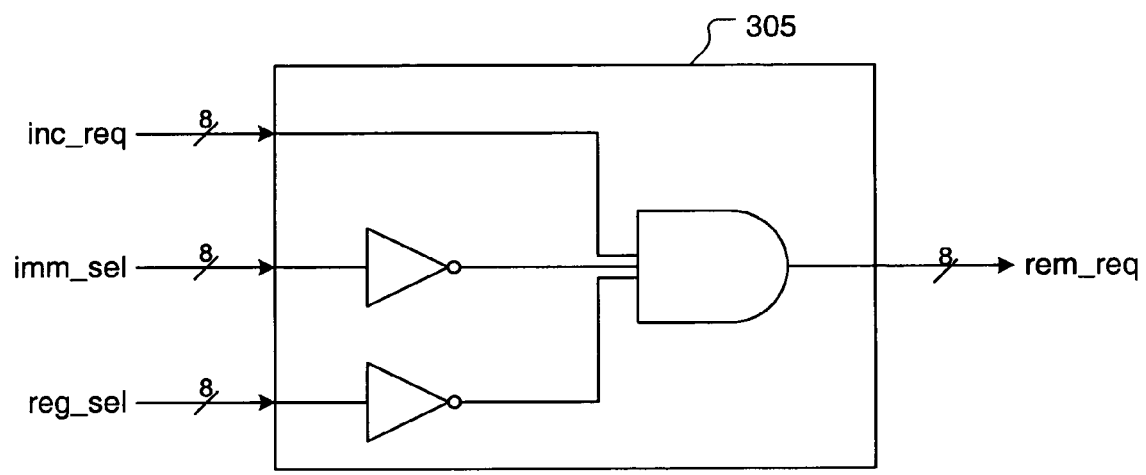
FIG. 5 is an illustration showing the remaining requestors determination logic, in accordance with one embodiment of the present invention.

FIG. 5 is an illustration showing the remaining requestors determination logic 305, in accordance with one embodiment of the present invention. The remaining requestors determination logic 305 receives as input each of the inc_req, imm_sel, and reg_sel signals generated by the input processing logic 303. The remaining requestors determination logic 305 is defined to perform a bit-wise AND operation on the inc_req signal, an inversion of the imm_sel signal, and an inversion of the reg_sel signal. More specifically, each bit in the inc_req signal is AND'd with an inverted state of the corresponding bit in the imm_sel signal and is also AND'd with an inverted state of the corresponding bit in the reg_sel signal. The output of the bit-wise AND operation performed by the remaining requestors determination logic 305 defines a signal "rem_req", which represents the remaining requestors available for selection in the present clock cycle by the particular arbitrator within which the arbitration logic 301 resides.

As each requestor is represented by a respective bit in each of the inc_req, imm_sel, and reg_sel signals, so is each requestor represented by the corresponding respective bit in the rem_req signal. Thus, in the present exemplary embodiment having eight requestors, the rem_req signal is defined by eight bits. According to the remaining requestors determination logic 305, a particular requestor will be identified as being available for selection in the present clock cycle by setting its corresponding bit in the rem_req signal to a high state, if the following criteria are satisfied:
 the particular requestor is transmitting a request in the present clock cycle,
 the particular requestor has not already been selected by a higher level arbitrator in the present clock cycle, and
 the particular requestor is not continuing to be serviced from a selection made in a previous clock cycle.

Figure 6:
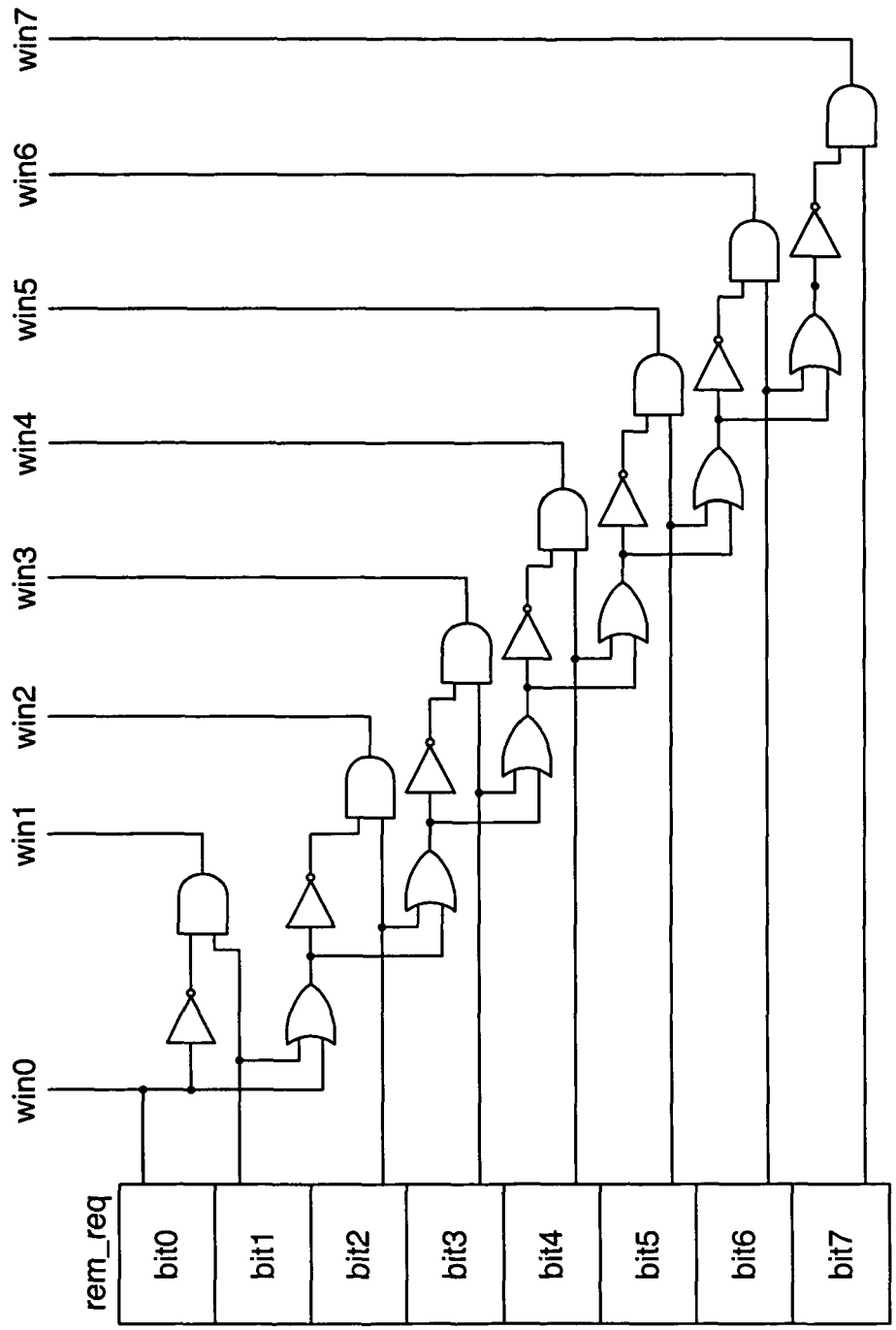
FIG. 6 is an illustration showing the requestor selection logic, in accordance with one embodiment of the present invention.

FIG. 6 is an illustration showing the requestor selection logic 307, in accordance with one embodiment of the present invention. The requestor selection logic 307 is defined to process the rem_req signal to determine which requestor is to be selected for servicing by the arbitration logic 301 in the present clock cycle. The requestor selection logic 307 essentially identifies the lowest bit of the rem_req signal having a high state. The requestor selection logic 307 identifies the requestor corresponding to the identified lowest high state bit of the rem_req signal as the requestor to be selected by the arbitration logic 301 for servicing in the present clock cycle.

The identification of which requestor is selected and which requestors are not selected for servicing in the present clock cycle is represented by signals win0 through win7 (collectively referred to as "win" signals), wherein each win signal corresponds to a respective requestor. A high state of a particular win signal indicates that the requestor corresponding to the particular win signal is selected by the arbitration logic 301 for servicing in the present clock cycle. It should be appreciated that because the present exemplary embodiment includes eight requestors, there are eight win signals. It should be further appreciated that the requestor selection logic 307 is defined such that one win signal can have a high state in a given clock cycle, thus one requestor can be identified as being selected for servicing in a given clock cycle. Each win signal is concatenated together to form the output signal of the arbitration logic 301. Thus, the concatenated win signals define both the ARB_ISn and ARB_RSn outputs of the arbitrator 119a-119d.

The functionality of the requestor selection logic 307 is described by the following pseudocode, wherein numbers indicated in brackets [ ] correspond to bits in the rem_req signal:
 win0=rem_req[0];
 win1=rem_req[1] AND
 NOT (rem_req[0]);
 win2=rem_req[2] AND
 NOT (rem_req[0] OR
  rem_req[1]);
 win3=rem_req[3] AND
 NOT (rem_req[0] OR
  rem_req[1] OR
  rem_req[2]);
 win4=rem_req[4] AND
 NOT (rem_req[0] OR
  rem_req[1] OR
  rem_req[2] OR
  rem_req[3]);
 win5=rem_req[5] AND
 NOT (rem_req[0] OR
  rem_req[1] OR
  rem_req[2] OR
  rem_req[3] OR
  rem_req[4]);
 win6=rem_req[6] AND
 NOT (rem_req[0] OR
  rem_req[1] OR
  rem_req[2] OR
  rem_req[3] OR
  rem_req[4] OR
  rem_req[5]);
 win7=rem_req[7] AND
 NOT (rem_req[0] OR
  rem_req[1] OR
  rem_req[2] OR
  rem_req[3] OR
  rem_req[4] OR
  rem_req[5] OR
  rem_req[6]).

Based on the above description of arbitrators 119a-119d, it can be seen that the requestor represented by the lowest bit (bit 0) in the rem_req signal will be most favored for selection, while the requestor represented by the highest bit (bit 7 in the present exemplary embodiment) will be least favored for selection. Thus, a fixed priority exists with respect to requestor selection by the arbitrators 119a-119d. To avoid having certain requestors favored more for servicing selection, a fairness embodiment of the present invention is also provided.

In the fairness embodiment, the ordering of requestor activity input signals (REQ0 through REQ7 in the present exemplary embodiment) to each arbitrator 119a-119d is rotated between successive arbitrators in the arbitrator hierarchy. In this embodiment, rotation of the requestor activity input signals is performed following receipt of the requestor activity input signals into the arbitration logic 301 and prior to transmission of the requestor activity input signals to the input processing logic 303. Also, in this embodiment, a reverse rotation of the win signals is performed between the requestor selection logic 307 and the output of the arbitration logic 301. Thus, it should be appreciated that the fairness embodiment can be implemented without having to change the arbitration logic 301 as described above.

With respect to the exemplary embodiment described herein, the fairness embodiment is implemented as follows:
 the requestor activity signals are processed by the arbitration logic 301 of arbitrator 0 (119a) in order of REQ0, REQ1, REQ2, REQ3, REQ4, REQ5, REQ6, REQ7;
 the requestor activity signals are processed by the arbitration logic 301 of arbitrator 1 (119b) in order of REQ2, REQ3, REQ4, REQ5, REQ6, REQ7, REQ1, REQ0;
 the requestor activity signals are processed by the arbitration logic 301 of arbitrator 2 (119c) in order of REQ4, REQ5, REQ6, REQ7, REQ3, REQ2, REQ1, REQ0;
 the requestor activity signals are processed by the arbitration logic 301 of arbitrator 3 (119d) in order of REQ6, REQ7, REQ5, REQ4, REQ3, REQ2, REQ1, REQ0.

The number of requestor activity signal inputs to shift between each successive arbitrator in the arbitrator hierarchy is determined by dividing the number of requestors by the number of arbitrators, i.e., the number of masters.

Figure 7:
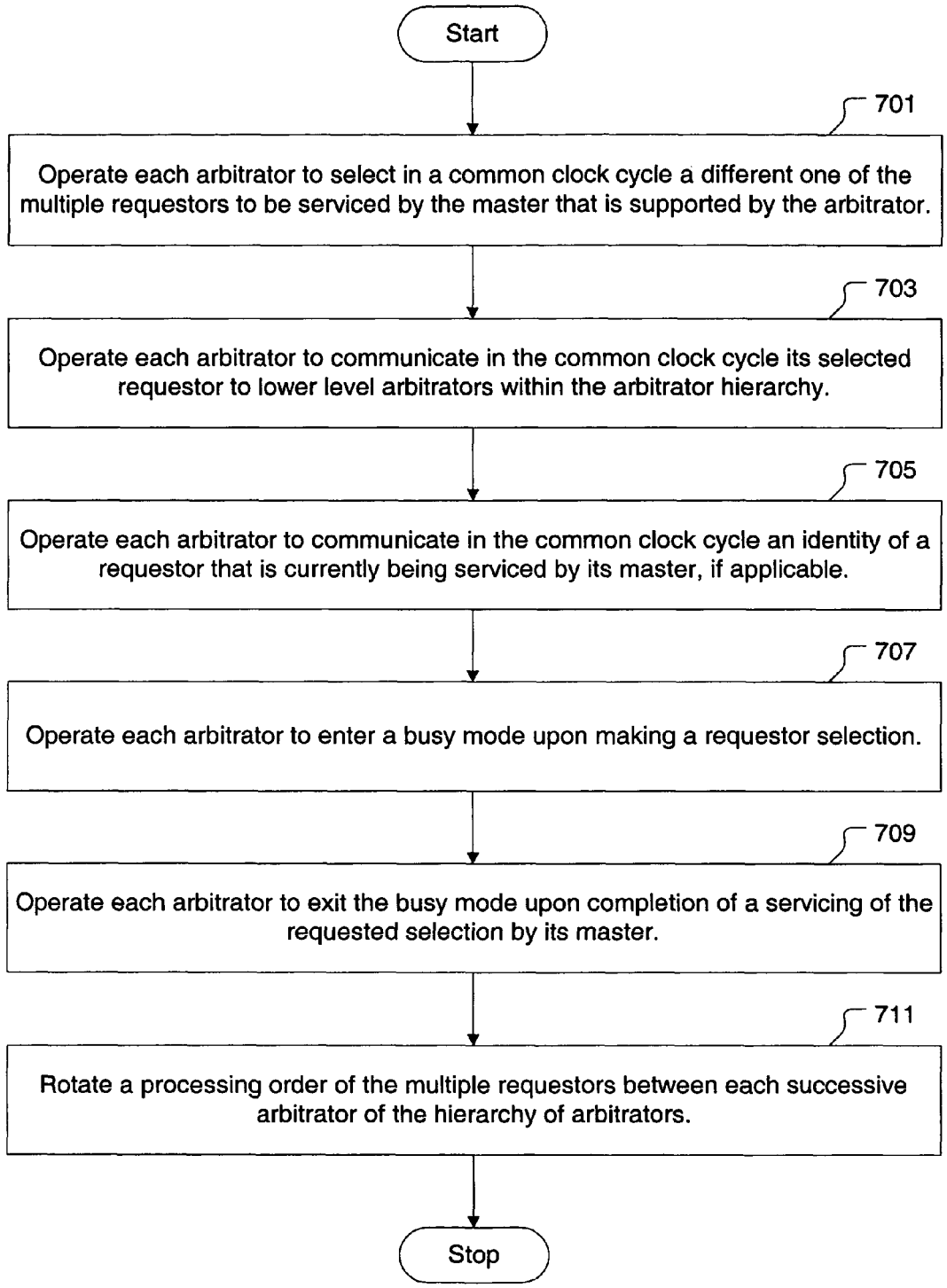
FIG. 7 is an illustration showing a flowchart of a method for operating arbitrators in a hierarchy of arbitrators to uniquely connect multiple requestors to multiple masters in a same clock cycle, in accordance with one embodiment of the present invention.

In accordance with the foregoing description, the present invention provides an apparatus for real-time arbitration between multiple requestors and multiple masters. Additionally, the present invention can be embodied as a method for operating such an apparatus. FIG. 7 is an illustration showing a flowchart of a method for operating arbitrators in a hierarchy of arbitrators to uniquely connect multiple requestors to multiple masters in a same clock cycle, in accordance with one embodiment of the present invention. It should be understood that each of the arbitrators in the hierarchy of arbitrators is assigned to support a different one of the multiple masters.

The method includes an operation 701 for operating each arbitrator to select in a common clock cycle a different one of the multiple requestors to be serviced by the master that is supported by the arbitrator. In an operation 703, each arbitrator is operated to communicate in the common clock cycle its selected requestor to lower level arbitrators within the arbitrator hierarchy. Also, in an operation 705, each arbitrator is operated to communicate in the common clock cycle an identity of a requestor that is currently being serviced by the master that is supported by the arbitrator, if applicable. It should be appreciated that communication of the selected requestors to lower level arbitrators, and communication of the identities of the requestors currently being serviced, enables each arbitrator to select in the common clock cycle the different one of the multiple requestors to be serviced by its master.

The method can also be expanded to include an operation 707 for operating each arbitrator to enter a busy mode upon making a requestor selection, and an operation 709 for operating each arbitrator to exit the busy mode upon completion of a servicing of the requested selection by its master. Entering the busy mode prevents the arbitrator from making another requestor selection while the presently selected requestor is being serviced. The method can be further expanded to include an operation 711 for rotating a processing order of the multiple requestors between each successive arbitrator of the hierarchy of arbitrators. Rotating the processing order of the multiple requestors avoids having particular requestors always more favored for selection by the arbitrators.

One skilled in the art will appreciate that the present invention can be defined on a semiconductor chip using logic gates configured to provide the functionality of the method as previously discussed. For example, a hardware description language (HDL) can be employed to synthesize hardware and a layout of the logic gates for providing the necessary functionality described herein.

Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A circuit for handling multiple requestors desiring access to a resource, comprising:
   a plurality of arbitrators; and
   a plurality of masters, each master being assigned to a different one of the plurality of arbitrators,
   wherein each arbitrator is defined to select in a same clock cycle a different one of the multiple requestors for servicing by the master assigned to the arbitrator, wherein selection of a particular requestor is not duplicated among the plurality of arbitrators.

2. A circuit for handling multiple requestors desiring access to a resource as recited in claim 1, wherein the plurality of arbitrators forms an arbitrator hierarchy.

3. A circuit for handling multiple requestors desiring access to a resource as recited in claim 2, wherein each arbitrator is defined to immediately notify each lower-level arbitrator in the arbitrator hierarchy of the requestor selected for servicing, the immediate notification occurring in the same clock cycle that the requestors are selected by each arbitrator for servicing.

4. A circuit for handling multiple requestors desiring access to a resource as recited in claim 1, wherein each arbitrator is defined to register the requestor selected for servicing, each arbitrator being further defined to direct the master assigned to the arbitrator to service the registered requestor in subsequent clock cycles following the clock cycle in which the requestors are selected by each arbitrator.

5. A circuit for handling multiple requestors desiring access to a resource as recited in claim 4, wherein each arbitrator is defined to communicate the registered requestor to each other arbitrator during servicing of the registered requestor by the master assigned to the arbitrator, each arbitrator receiving the communication of the registered requestor being defined to avoid duplicating selection of the registered requestor.

6. A circuit for handling multiple requestors desiring access to a resource as recited in claim 1, wherein each arbitrator is defined to include remaining requestor determination logic, the remaining requestor determination logic being defined to identify to the arbitrator the requestors available for immediate selection, the requestors available for immediate selection being those requestors that are currently transmitting a request and are not already selected for servicing in the same clock cycle by a higher-level arbitrator and are not registered by another arbitrator as being presently serviced.

7. A circuit for handling multiple requestors desiring access to a resource as recited in claim 6, wherein the remaining requestor determination logic is defined to communicate a signal indicating the identity of each requestor that is available for immediate selection.

8. A circuit for handling multiple requestors desiring access to a resource as recited in claim 7, wherein each arbitrator is defined to include requestor selection logic for selecting the requestor to be serviced by the master assigned to the arbitrator, the requestor selection logic being defined to select a most significant requestor that is available for immediate selection as indicated by the signal communicated by the remaining requestor determination logic.

9. A circuit for handling multiple requestors desiring access to a resource as recited in claim 1, wherein each arbitrator is defined to rotate an ordering of the multiple requestors between successive arbitrators in the arbitrator hierarchy, the rotation of the ordering of the multiple requestors preventing a particular requestor from being favored for selection over other requestors.

10. An interface circuit defined to connect a plurality of requestors to a plurality of masters, wherein a number of the plurality of requestors exceeds a number of the plurality of masters, comprising:
 a plurality of arbitrators representing an arbitrator hierarchy, each of the plurality of arbitrators being uniquely assigned to one of the plurality of masters, each of the plurality of arbitrators being defined to select in a same clock cycle a different one of the plurality of requestors to be serviced by the master to which the arbitrator is uniquely assigned.

11. An interface circuit as recited in claim 10, wherein each of the plurality of arbitrators is defined to communicate in the same clock cycle its selected requestor to lower level arbitrators within the arbitrator hierarchy.

12. An interface circuit as recited in claim 11, wherein each of the plurality of arbitrators is being defined to communicate in the same clock cycle an identity of a requestor currently being serviced by the master to which the arbitrator is uniquely assigned if applicable.

13. An interface circuit as recited in claim 12, wherein communication of the selected requestors to lower level arbitrators and communication of the identities of the requestors currently being serviced enables each arbitrator to select the requestor to be serviced by the master to which the arbitrator is uniquely assigned.

14. An interface circuit as recited in claim 10, wherein each of the plurality of arbitrators is defined to include remaining requestor determination logic, the remaining requestor determination logic being defined to identify to the arbitrator requestors available for immediate selection, the requestors available for immediate selection being those requestors in the plurality of requestors that are currently transmitting a request and are not already selected for servicing in the same clock cycle by a higher-level arbitrator and are not registered by another arbitrator as being presently serviced.

15. An interface circuit as recited in claim 14, wherein the remaining requestor determination logic is defined to communicate a signal indicating the identity of each requestor that is available for immediate selection.

16. An interface circuit as recited in claim 15, wherein each of the plurality of arbitrators is defined to include requestor selection logic for selecting the requestor to be serviced by the master to which the arbitrator is uniquely assigned, the requestor selection logic being defined to select a most significant requestor that is available for immediate selection as indicated by the signal communicated by the remaining requestor determination logic.

17. A method for operating arbitrators in a hierarchy of arbitrators to uniquely connect multiple requestors to multiple masters in a common clock cycle, wherein each of the arbitrators supports a different one of the multiple masters, comprising:
 operating each arbitrator to select in the common clock cycle a different one of the multiple requestors to be serviced by the master being supported by the arbitrator.

18. A method as recited in claim 17, further comprising:
 operating each arbitrator to communicate in the common clock cycle its selected requestor to lower level arbitrators within the arbitrator hierarchy; and
 operating each arbitrator to communicate in the common clock cycle an identity of a requestor currently being serviced by the master being supported by the arbitrator if applicable,
 wherein communication of the selected requestors to lower level arbitrators and communication of the identities of the requestors currently being serviced enables each arbitrator to select in the common clock cycle the different one of the multiple requestors to be serviced by the master being supported by the arbitrator.

19. A method as recited in claim 17, further comprising:
 operating each arbitrator to enter a busy mode upon making a requestor selection, the busy mode preventing the arbitrator from making another requestor selection; and
 operating each arbitrator to exit the busy mode upon completion of a servicing of the requested selection by the master being supported by the arbitrator.

20. A method as recited in claim 17, further comprising:
 rotating a processing order of the multiple requestors between each successive arbitrator of the hierarchy of arbitrators, wherein rotating the processing order avoids having particular requestors always more favored for selection by the arbitrators.

* * * * *